July 3, 1934.  H. H. JOHNSON  1,965,497
MILKING MACHINE
Filed June 23, 1932  2 Sheets-Sheet 1
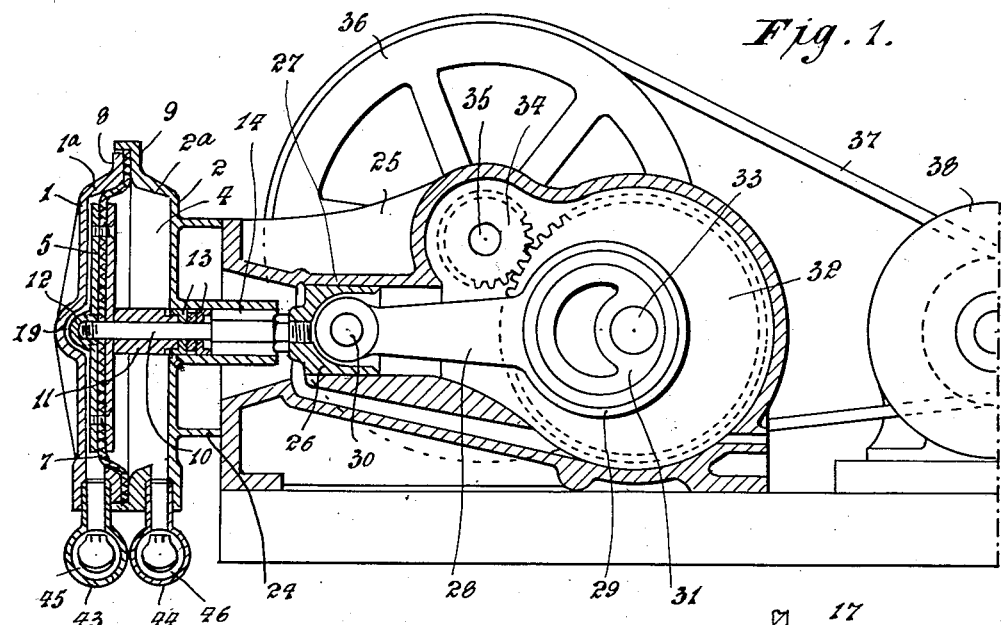
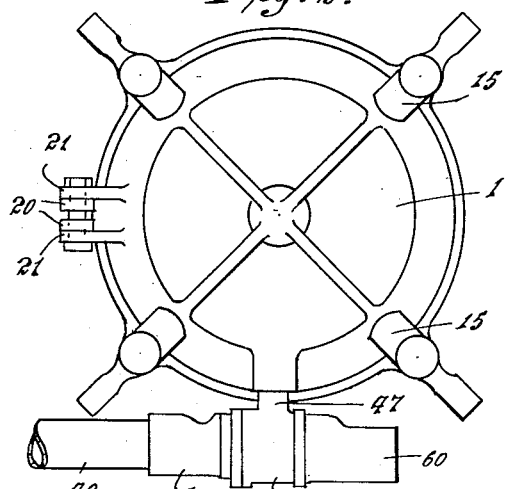
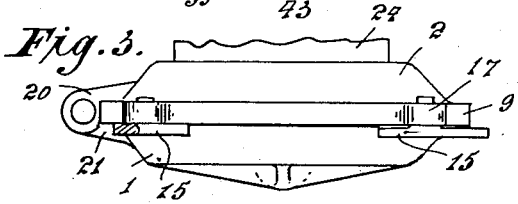
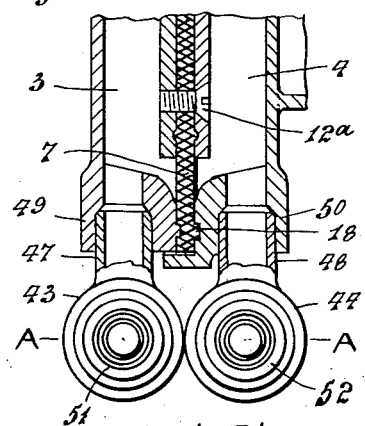
H. H. Johnson
INVENTOR
By Marks & Clerk
Attys.

July 3, 1934.　　　H. H. JOHNSON　　　1,965,497
MILKING MACHINE
Filed June 23, 1932　　2 Sheets-Sheet 2
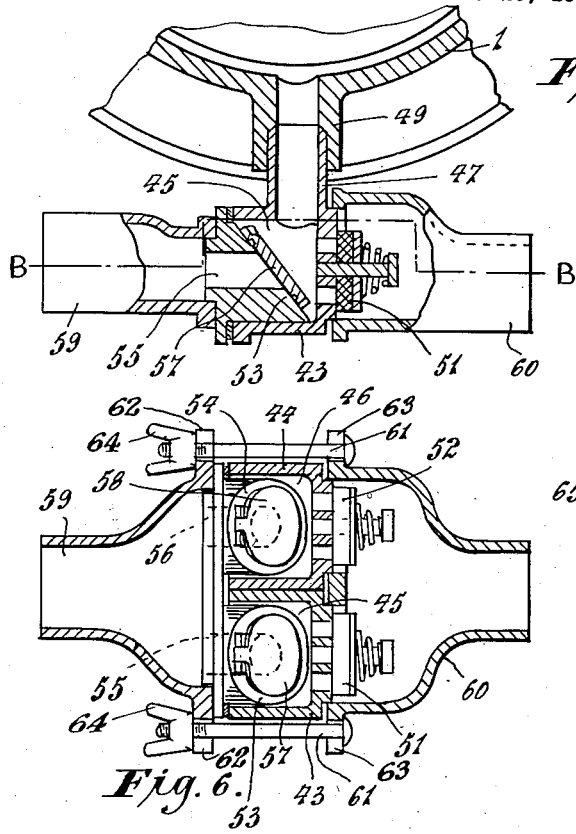
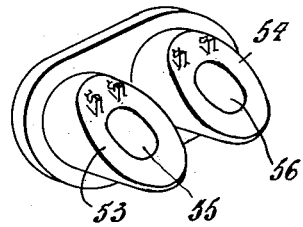
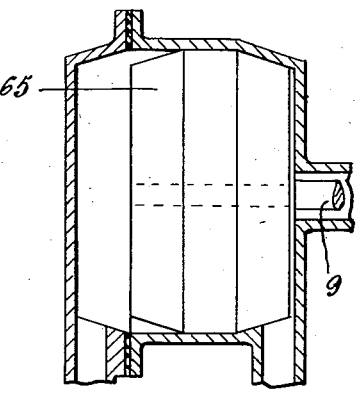
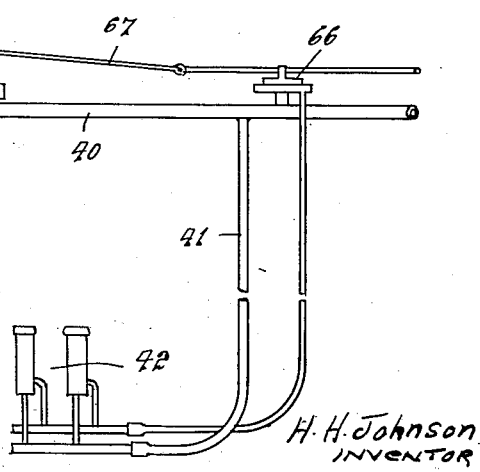

Patented July 3, 1934

1,965,497

UNITED STATES PATENT OFFICE 1,965,497

MILKING MACHINE

Henry Hans Johnson, Palmerston North, New Zealand

Application June 23, 1932, Serial No. 618,995
In New Zealand July 16, 1931

5 Claims. (Cl. 103—150)

This invention relates to milking machinery of the type wherein the milk is drawn by suction from the teat cups or from any vessel in which the milk, cream, or the like is placed.

The object of the present invention is to obviate in a milking machine the use of vacuum tanks and a separate pump and releaser, and to provide a single apparatus to produce combinedly the separate functions of each of the above devices.

A further object is that all the working parts may be easily and thoroughly cleansed.

According to the present invention, milk receiving chambers, to which the milk pipes lead, have their interiors adapted to be restricted and enlarged alternately to each other, the combined alternate action within the chambers operating so as to create a continuous vacuum suction in the milk pipes for the purpose of drawing the milk directly but alternately into each chamber, while means are provided to prevent the return of the milk from the chambers into the milk pipes, the milk drawn into the chambers being discharged into the atmosphere by the alternate restriction and enlargement taking place within the chambers. In other words, the arrangement provides pumping means which create a continuous suction along the milk pipe lines, which suction draws the air and milk into the alternate chambers forming part of the pumping means, where the milk and air are trapped against return into the pipes and are forced into the atmosphere without passing through or between any moving parts of the pumping means.

Suitable non-return means are provided to prevent air being drawn from the atmosphere into the chambers.

An example of the invention is given in the accompanying drawings, wherein:—

Figure 1 is a longitudinal sectional view showing the pumping means and method of drive from a motor.

Figure 2 is an end elevation.

Figure 3 is a plan.

Figure 4 is a fragmentary cross section of the chambers on a larger scale.

Figure 5 is a cross section of the valves taken on line A—A Figure 4.

Figure 6 is a sectional plan along line B—B Figure 5 the valves therein being shown in plan.

Figure 7 is a perspective view of valve seatings.

Figure 8 is a sectional view through chambers of a modified form.

Figure 9 shows the general assembly of a milking machine.

Referring to the drawings, a chamber is formed by two walls 1 and 2 having slightly dished circumferential inner sides 1a and 2a respectively, and having a flexibly movable piston 5 located between the two walls, thus forming the chamber into two separate compartments or chambers 3 and 4. The piston is formed of plates 6 having clamped between them a flexible ring or diaphragm 7, preferably of rubber, held at its outer circumferential edge between circumferential flanges 8 and 9 on the walls 1 and 2. The plates 6 of the piston are held on the end of a rod 10, which passes through a sleeve 11, by one of such plates passing over the threaded end and the other plate having a boss 12 threaded to screw upon the end of the rod so that the ring 7 may be securely clamped between the two plates 6, the sleeve 11 forming a shoulder which in turn bears on gland washers 13 against a shoulder on the rod 10 which passes through a stuffing gland 14 formed from the wall 2. Clamps 15 pivoted on pins 16 projecting therefrom and passing through bosses 17 on the flange 9, bear on the face of the flange 8 and enable the two walls 1 and 2 to be brought together to give the required tightening to hold the ring 7 in position and render the chambers airtight. The inner side of the flanges 8 and 9 and also the inner side of the plates 6 have circular ridges and recesses, as at 18, in order to grip better the flexible ring 7. The plates 6 are of a diameter so that when the piston is reciprocated to the end of its stroke, it will lie against the flat or undished portion of the walls 1 and 2, as shown in Figure 1, a recess 19 in the wall 1 receiving the boss 12, the ring 7 providing a seal between the piston and the compartment on each side of such piston. The wall 1 may be hinged on the flange 9 of the wall 2 by a pin passing through lugs 20 on the flange 9 and through lugs 21 projecting from the flange 8 of the wall 1.

A circular flange 24 enables the chamber to be secured to the end of a frame 25 containing the driving gear.

The piston is reciprocated by means of the spindle 9a, the other end of which is connected to a crosshead 26 running in a guide 27 of the frame 25. A connecting rod 28 integral with an eccentric strap 29 is pivoted on a pin 30 in the crosshead 26 and the eccentric strap passes over an eccentric ring 31 fixed on or forming part of a toothed wheel 32 mounted on a shaft 33 in bearings in the frame. This wheel is driven by a pinion 34 on a shaft 35 also mounted in bearings in the frame and having a driving wheel 36 driven by a belt 37 from a motor 38.

The milk pipe 40 (see also Figure 9) to which the branch pipes 41 from the various units 42 are taken, leads towards the chambers and communicates with two members 43 and 44 (see Figures 1, 4, 5 and 6) having horizontal passages 45 and 46, each member being separately and respectively attached to the walls 1 and 2 by integral vertical pipes or nipples 47 and 48 respectively fixed into bosses 49 and 50 formed on the lower part of the walls 1 and 2. The two members 43 and 44 each have spring operated outlet valves 51 and 52 controlling one end of the passages 45 and 46. The passages 45 and 46 thus respectively open into the chambers 3 and 4 on alternate sides of the piston 5, as clearly shown in Figure 4. Valve seatings 53 and 54 projecting from one flange face are respectively entered into the passages 45 and 46 the ports 55 and 56 of the seatings being normally closed by respective flap valves 57 and 58. A flared cap 59, to which the milk pipe 40 is attached is fitted over a projecting shoulder of the flange face of the valve seatings while another cap 60 is fitted on the members 43 and 44 over the valves 51 and 52, and forms the discharge or delivery pipe. The cap 59, valve seatings 53 and 54 and cap 60 are held in position on the members 43 and 44 by means of bolts 61 passing through forks 62 and 63 on the caps 59 and 60 and tightened by wing nuts 64. When either one or the other of the compartments 3 and 4 is restricted by the piston, the milk will be forced out of such compartment into a passage 45 or 46 and past a spring outlet valve 51 or 52 into the discharge cap 60, the valves 51 and 52 preventing any return into the milk pipe.

In operation, upon the piston 5 being reciprocated at the desired speed by the motor through the intervention of the mechanism shown in Figure 1 each compartment or chamber 3 and 4 is alternately restricted and enlarged. For example, upon the piston moving towards and reaching the position shown in Figure 1, the chamber 4 becomes enlarged and rarefies the air therein and creates a suction in the pipe 40 through the passage 46 and past the valve 58 but on its return the piston will tend to compress the air drawn into the chamber 4, forcing the valve 58 down on its seat, thus preventing any return to the pipe 40, and forcing the air and milk past the valve 52 into the discharge pipe 60.

Similarly, the chamber 3 immediately it tends to become enlarged continues the suction in the pipe 40 through the passage 45 and valve 57. Thus, the continued reciprocation and continued alternate enlargement and restriction of the two chambers provides a continuous suction in the pipe 40 and a continuous discharge through the cap 60, causing the milk from the cups to flow evenly along the cap 40 and alternately into the chambers from where it is alternately expelled and issues from the cap 60 in a continuous stream.

In Figure 8, the chambers are similarly built, except that instead of having a piston connected by a flexible ring to the walls of the chambers, a sliding joint is made by having a solid piston, 65, as shown. This necessitates the slight modification in the form of the chambers, but overwise it is precisely the same, the piston being threaded on the end of the spindle 9.

By reason of the construction of the chambers, they may be readily taken apart for cleaning purposes, the example given in Figures 1 to 4 being simply that upon the clamps 15 being rotated clear of the flange 8 the wall 1 can open on its hinge and when this wall opens it will carry with it the member 43. In this construction, however, the cap 59 would be disconnected from the milk pipe 40 and the valve seatings 53 and 54 would first have to be removed from the members. Also the whole apparatus can be readily cleaned by simply sucking water through the teat cups into the milk pipe, and this water will be thoroughly pumped through the chambers and through the discharge pipe 60, thus cleaning the interior of the chambers and the valves.

In Figure 9, pulsators 66 for each milking unit derives its vacuum from the milk pipe 40 in the usual way, and have their slide valve reciprocated by a rod 67 pivoted to a crank or eccentric fitted on the shaft 33.

The result of the above construction is that a simpler form of machine is obtainable in which the vacuum created is steady and certain for the purpose of drawing the milk along the main milk lines from any number of units and enables the milk evenly to travel along the pipe lines and to be delivered from the machine in a steady and even flow, such vacuum also serving for the purpose of pulsating the teat cups, and, as above pointed out, the use of a separate vacuum tank, vacuum producing pump, and releaser, is eliminated, the functions of these being obtained by the one apparatus.

Other desirable results are obtained in that all the working parts can be thoroughly cleansed at the one operation and there is no part into which milk is drawn by vacuum and remains to set up contamination.

What I claim is:—

1. In vacuum milking machines, a milk pipe line having two branches, a pair of milk receiving chambers separable from each other, nipples depending from the lower portions of the respective chambers and attachable and detachable from said branches, the chambers having means between them adapted to restrict and enlarge alternately the capacity of the chambers to draw air or milk from the main milk pipe line directly into the lower portions of the chambers, means to prevent the return of air and milk from each of said chambers into the main milk pipe line and means for operating the restricting and enlarging means.

2. In a device of the character described, a main milk pipe and a pump, said pump comprising two chambers of substantially equal capacities, one portion hinged to the other, a movable wall adapted to be clamped between said hinged portions of the pump, the sides of the wall and inner sides of the chambers being substantially parallel and valved connections between each chamber and main milk pipe.

3. In a device as claimed in claim 2, the walls of each chamber being of internal conical frustum form and the inlet and outlet being at the bottom portion of the pump whereby the flexible moving walls may conform to the chamber walls and cause practically a displacement of the entire interior of the chambers.

4. In a device as claimed in claim 2, wherein the moving wall includes a flexible disc secured between the hinged portions of the pump, the hinged side having clamps attached to the other side and rotatable into and out of clamping position.

5. A pump comprising two chambers having one entire side detachable from the pump, reciprocable means to fit the interior of the pump and adapted when reciprocated to force from one side of the pump practically all the fluid therein, nipples, one on each side of the reciprocable part and each nipple having inlet and outlet valves, the sides of the reciprocable part being substantially parallel to the sides of the pump.

HENRY HANS JOHNSON.